US010296257B2

(12) United States Patent
Okabe

(10) Patent No.: US 10,296,257 B2
(45) Date of Patent: May 21, 2019

(54) CONTROL DEVICE AND CONTROL METHOD

(71) Applicant: Kabushiki Kaisha Toshiba, Minato-ku, Tokyo (JP)

(72) Inventor: Motohiko Okabe, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 73 days.

(21) Appl. No.: 15/423,329

(22) Filed: Feb. 2, 2017

(65) Prior Publication Data

US 2017/0235517 A1   Aug. 17, 2017

(30) Foreign Application Priority Data

Feb. 15, 2016 (JP) .................................. 2016-026313

(51) Int. Cl.
*G06F 3/06* (2006.01)
(52) U.S. Cl.
CPC .......... *G06F 3/0647* (2013.01); *G06F 3/0604* (2013.01); *G06F 3/0656* (2013.01); *G06F 3/0683* (2013.01)
(58) Field of Classification Search
CPC ..... G11C 11/4093; G11C 7/10; G11C 7/1084; G11C 7/1087; G11C 7/1057; G11C 11/4096; G06F 3/0604; G06F 3/0683; G06F 3/0656; G06F 3/0647; G06F 3/0638

USPC .......................................................... 711/165
See application file for complete search history.

(56) References Cited

U.S. PATENT DOCUMENTS

| 6,338,109 | B1 * | 1/2002 | Snyder | ................ | G06F 15/7814 |
| | | | | | 710/100 |
| 9,459,607 | B2 * | 10/2016 | Frazer | .................... | G05B 15/02 |
| 2005/0160222 | A1 * | 7/2005 | Innan | .................... | G06F 3/0605 |
| | | | | | 711/114 |
| 2008/0046103 | A1 * | 2/2008 | Ashida | ................. | G05B 19/054 |
| | | | | | 700/86 |

FOREIGN PATENT DOCUMENTS

| CN | 101131575 A | 2/2008 |
| JP | H08-147013 A | 6/1996 |
| JP | 2008-047052 A | 2/2006 |

* cited by examiner

*Primary Examiner* — Hashem Farrokh
(74) *Attorney, Agent, or Firm* — Knobbe, Martens, Olson & Bear LLP

(57) ABSTRACT

A control device according to an embodiment includes a first memory, a controller, a communication unit, and a second memory. The second memory stores a table with which an input area and an output area can be identified within the memory area. The controller sets the input areas to a first predetermined area in one transmission process based on the table when the first data is transmitted from a buffer area which a buffer memory has to the memory area, and sets the output areas to the first predetermined area in one transmission process based on the table when the first data is transmitted from the memory area to the buffer area.

8 Claims, 12 Drawing Sheets

US 10,296,257 B2

CONTROL DEVICE AND CONTROL METHOD

CROSS-REFERENCE TO RELATED APPLICATION

This application is based upon and claims the benefit of priority from Japanese Patent Application No. 2016-026313, filed Feb. 15, 2016, the entire contents of which are incorporated herein by reference.

FIELD

Embodiments described herein relate generally to a control device and a control method.

BACKGROUND

A control device that controls an industrial system such as a steel plant, a paper manufacturing plant, or a petrochemical plant and a public system such as a water and sewage system receives input data related to control of an input and output device from the input and output device which is a control target external device with the aid of an I/O interface and temporarily writes the input data to an input register which is a memory area for the input data via a system bus. The control device writes the result of an arithmetic process performed on the input data stored in the input register to an output register which is a memory area for the output data as output data. After that, the control device transmits the output data stored in the output register to the input and output device with the aid of the I/O interface.

By the way, the control device performs batch input and output that the control device writes all items of input data newly received from the input and output device to the input register before an arithmetic process is performed on the input data stored in the input register and transmits all items of output data stored in the output register to the input and output device after the arithmetic process is performed on the input data stored in the input register. That is, the control device writes the input data received from the input and output device to the input register even when there is no change in the input data received from the input and output device and transmits the output data stored in the output register to the input and output device even when there is no change in the output data stored in the output register.

However, the number of items of data transmitted and received at a time between the control device and the input and output device is approximately 1,000 items in a medium-scale industrial or public system and is approximately 100,000 items in a large-scale industrial or public system. Therefore, batch input and output takes lots of time and it is difficult to shorten a control cycle of controlling the industrial or public system.

DETAILED DESCRIPTION

In general, according to one embodiment, a control device according to an embodiment includes a first memory, a controller, a communication unit, and a second memory. The first memory has a plurality of memory areas and stores first data related to control of an external device. The controller executes an access to a memory area. The communication unit includes a buffer memory having a buffer area corresponding to each memory area, and a communication controller that performs a communication process of transmitting to the first data to the external device and receiving the first data from an external device, a storage process of storing the first data in the buffer area, a transmission process of transmitting the first data between a first predetermined area of the memory area and a buffer area corresponding to the first predetermined area without the controller, and an inhibition process of inhibiting an access of the controller to the first predetermined area whenever the transmission process is performed. The second memory stores a table with which an input area and an output area can be identified within the memory area, the input area of the memory area storing the first data received from the external device, and the output area of the memory area storing the first data to be transmitted to the external device. Moreover, the controller sets the input areas to the first predetermined area in one transmission process based on the table when the first data is transmitted from the buffer area to the memory area, and sets the output areas to the first predetermined area in one transmission process based on the table when the first data is transmitted from the memory area to the buffer area.

Hereinafter, a control system to which a control device and a control method according to the present embodiment are applied will be described with reference to the accompanying drawings.

(First Embodiment)

A configuration of a control system according to the present embodiment will be described with reference to FIG.

Figure 1:
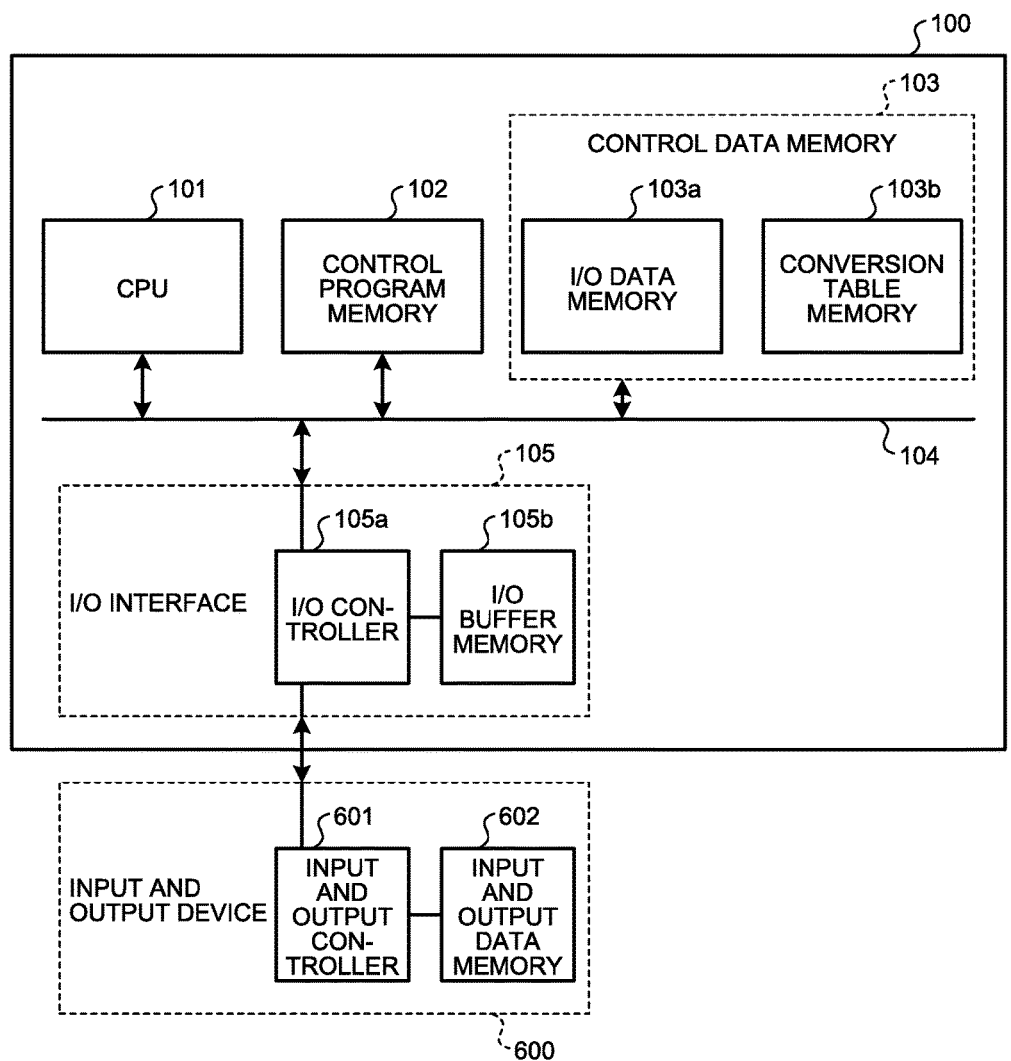
FIG. 1 is a diagram illustrating an example of a configuration of a control system according to a first embodiment.

1. FIG. 1 is a diagram illustrating an example of a configuration of the control system according to a first embodiment.

As illustrated in FIG. 1, a control system according to the present embodiment includes a control target input and output device 600 (an example of an external device) in various systems such as an industrial system such as a steel plant, a paper manufacturing plant, or a petrochemical plant and a public system such as a water and sewage system, and a control device 100 that controls the input and output device 600. In the present embodiment, the control device 100 and a plurality of input and output devices 600 are connected by a network such as a local area network (LAN) which conforms to the Ethernet (registered trademark).

The control device 100 and the input and output device 600 scan-transmits control data (an example of first data) which is data related to control of the input and output device 600. Here, scan-transmission is a function of broadcasting control data to the control device 100 or an external device such as the input and output device 600 and the like connected by the network. In this way, the control device 100 and the input and output device 600 can share the control data.

As illustrated in FIG. 1, the input and output device 600 includes an input and output controller 601 and an input and output data memory 602. The input and output data memory 602 is a memory having a plurality of memory blocks capable of storing the control data to be scan-transmitted (that is, control data shared by the control device 100 and another input and output device 600). The input and output controller 601 is a communication unit that communicates with the control device 100 and the other input and output device 600 via a network. In the present embodiment, the input and output controller 601 scan-transmits the control data stored in the input and output data memory 602 to the control device 100 and the other input and output device 600.

The control device 100 executes an arithmetic process on the control data scan-transmitted (input) from the input and output device 600 and scan-transmits (outputs) the result of the arithmetic process to the input and output device 600 as control data. As illustrated in FIG. 1, the control device 100 has a central processing unit (CPU) 101, a control program memory 102, a control data memory 103, and an I/O interface 105. Moreover, the CPU 101, the control program memory 102, the control data memory 103, and the I/O interface 105 are connected to each other by a system bus 104 such as a PCI Express.

The CPU 101 executes various arithmetic processes according to a control program stored in the control program memory 102. Moreover, the CPU 101 (an example of a controller) accesses a memory block of an I/O data memory 103a to be described later. The control program memory 102 stores a control program executed by the CPU 101.

The control data memory 103 stores a control variable which is data used in an arithmetic process in a course of the arithmetic process according to the control program by the CPU 101. In the present embodiment, the control data memory 103 has the I/O data memory 103a and a conversion table memory 103b. In the present embodiment, the control program memory 102 and the control data memory 103 are configured as two memories connected by the system bus 104. However, the control program memory 102 and the control data memory 103 may be configured as one memory.

The I/O data memory 103a is connected to the system bus 104. Moreover, the I/O data memory 103a (an example of a first memory) has a plurality of memory blocks (an example of a memory area) and can store control data. In the present embodiment, the I/O data memory 103a has a memory block provided in respective input and output devices 600. The conversion table memory 103b (an example of a second memory) stores a conversion table T (an example of a table). Here, the conversion table T is a table used for transmitting control data among the I/O data memory 103a, an I/O buffer memory 105b, and the input and output data memory 602.

The I/O interface 105 communicates with an external device such as the input and output device 600 via a network. In the present embodiment, the I/O interface 105 (an example of a communication unit) has an I/O controller 105a and the I/O buffer memory 105b. The I/O buffer memory 105b (an example of a buffer memory) has a buffer block (an example of a buffer area) corresponding to the respective memory blocks of the I/O data memory 103a and the input and output data memory 602.

The I/O controller 105a (an example of a communication controller) executes a communication process of transmitting and receiving control data to and from the input and output device 600 via a network. The I/O controller 105a executes a storage process of storing the control data transmitted and received in the buffer block of the I/O buffer memory 105b. That is, the I/O controller 105a executes a communication process of transmitting and receiving control data between a communication target block (an example of a second predetermined area) which is a predetermined memory block among the memory blocks of the input and output data memory 602, and a buffer block corresponding to the communication target block.

Moreover, the I/O controller 105a executes a transmission process of transmitting control data between a transmission target block (an example of a first predetermined area) which is a predetermined memory block among the memory blocks of the I/O data memory 103a, and a buffer block corresponding to the transmission target block via the system bus 104 without the CPU 101 by direct memory access (DMA) or the like. Furthermore, the I/O controller 105a executes an inhibition process of inhibiting an access of the CPU 101 to the transmission target block whenever the transmission process is performed. Specifically, the I/O controller 105a executes pre-processing of inhibiting an access of the CPU 101 to the transmission target block before the transmission process is performed. After that, the I/O controller 105a executes post-processing of cancelling the inhibition on an access of the CPU 101 to the transmission target block when the transmission process is completed.

Figure 2:
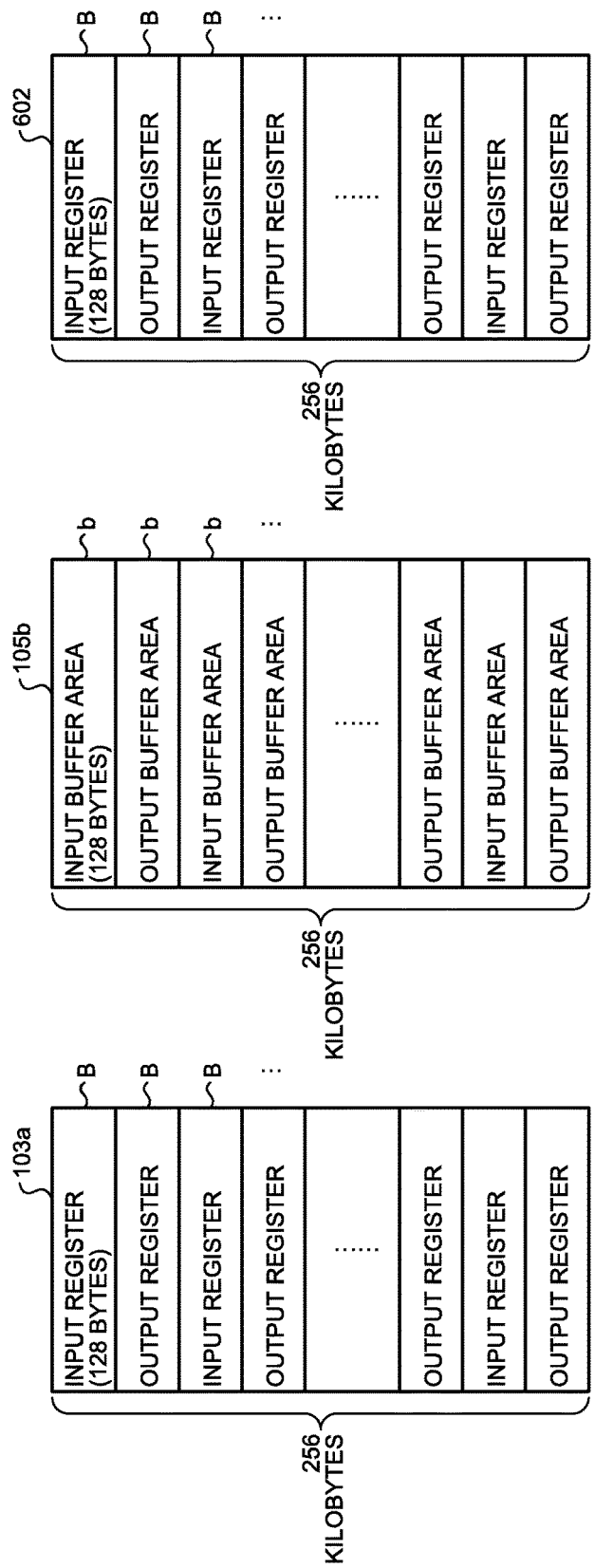
FIG. 2 is a diagram illustrating an example of a configuration of an I/O data memory, an I/O buffer memory, and an input and output data memory of the control system according to the first embodiment.

Next, a configuration of the I/O data memory 103a, the I/O buffer memory 105b, and the input and output data memory 602 will be described with reference to FIG. 2. FIG. 2 is a diagram illustrating an example of a configuration of an I/O data memory, an I/O buffer memory, and an input and output data memory of the control system according to the first embodiment.

As illustrated in FIG. 2, the I/O data memory 103a has a plurality of (for example, 2000) memory blocks B. Specifically, the I/O data memory 103a has an input register (an example of an input area) which is a memory block B for storing the control data received from the input and output device 600, and an output register (an example of an output area) which is a memory block B for storing the control data to be transmitted to the input and output device 600. Each memory block B has a capacity of 128 bytes. Therefore, the I/O data memory 103a has a capacity of 256 kilobytes.

Moreover, as illustrated in FIG. 2, the input and output data memory 602 (an example of a third memory) has the same memory block B as the I/O data memory 103a. Each memory block B of the input and output data memory 602 stores the same control data as that stored in the respective memory blocks B of the I/O data memory 103a. Specifically, the input and output data memory 602 has an input register and an output register similarly to the I/O data memory 103a. In the present embodiment, each memory block B of the input and output data memory 602 is provided in the same address area as each memory block B of the I/O data memory 103a. However, the present invention is not limited to this and each memory block B of the input and output data memory 602 may be provided in a different address area from the respective memory blocks B of the I/O data memory 103a.

As illustrated in FIG. 2, the I/O buffer memory 105b has a buffer block b provided in correspondence to the respective memory blocks B of the I/O data memory 103a to store the same control data as the respective memory blocks B. Specifically, the I/O buffer memory 105b has an input buffer area (that is, an input buffer area corresponding to the input register) which is a buffer block b that stores the control data received from the input and output device 600, and an output buffer area (that is, an output buffer area corresponding to the output register) which is a buffer block b that stores control data to be transmitted to the input and output device 600. Each buffer block b has a capacity of 128 bytes. Therefore, the I/O buffer memory 105b has a capacity of 256 kilobytes.

Figure 3:
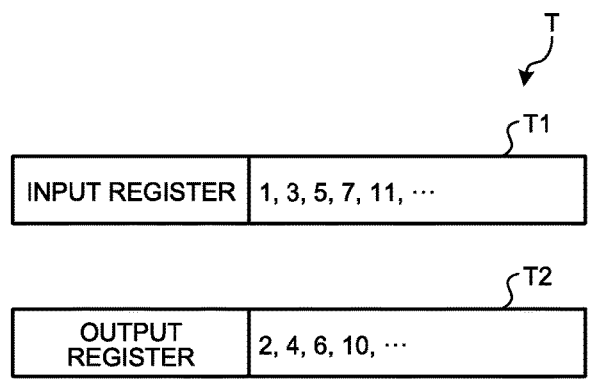
FIG. 3 is a diagram illustrating an example of a configuration of a conversion table stored in a conversion table memory of the control device according to the first embodiment.

Next, a configuration of the conversion table T stored in the conversion table memory 103b will be described with reference to FIG. 3. FIG. 3 is a diagram illustrating an example of a configuration of a conversion table stored in a conversion table memory of the control device according to the first embodiment.

The conversion table T (an example of a table) is a table with which the input registers of the input and output data memory 602 and the output registers of the input and output data memory 602 can be identified. As illustrated in FIG. 3, the conversion table T has an input register table T1 that stores actual numbers (1, 3, 5, 7, 11, . . . ) with which the input registers can be identified and an output register table T2 that stores actual numbers (2, 4, 6, 10, . . . ) with which the output registers can be identified.

Figure 4:
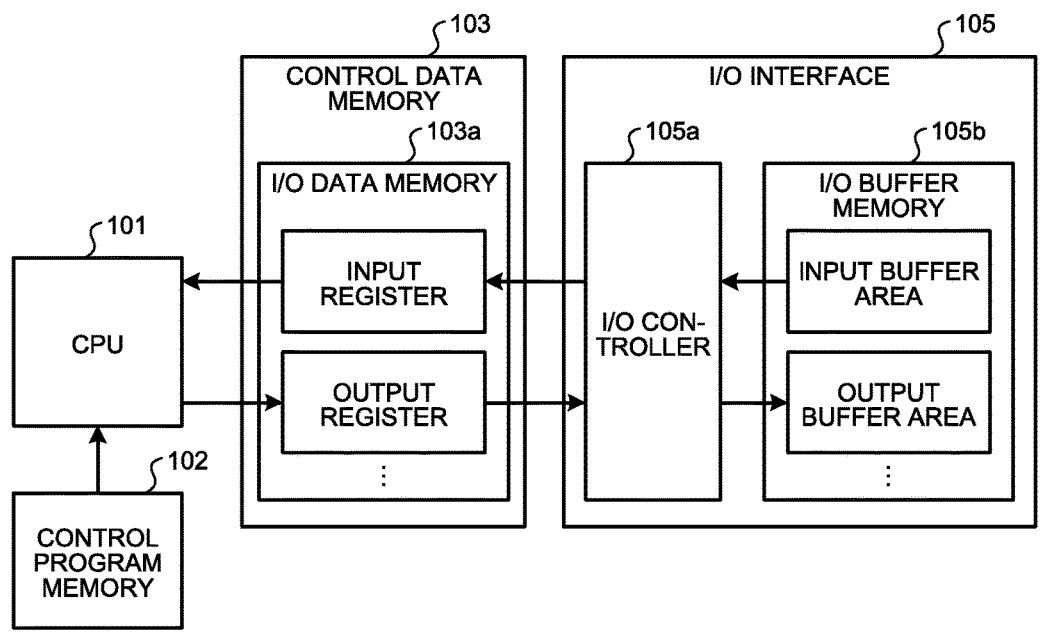
FIG. 4 is a diagram for describing an example of a transmission process of an I/O controller of the control device according to the first embodiment.

Next, the transmission process by the I/O controller 105a of the control device 100 will be described with reference to FIG. 4. FIG. 4 is a diagram for describing an example of a transmission process of an I/O controller of the control device according to the first embodiment.

First, the transmission process of control data from the input buffer area of the I/O buffer memory 105b to the input register of the I/O data memory 103a will be described with reference to FIG. 4. Upon receiving the control data scan-transmitted from the input and output device 600, the I/O controller 105a stores the control data in the input buffer area.

When the control data is stored in the input buffer area, the CPU 101 sets a plurality of (for example, four) input registers to a transmission target block which is a transmission destination in one transmission process sequentially in ascending order of the actual numbers stored in the input register table T1 among the input registers. In the present embodiment, the CPU 101 sets the input register to the transmission target block sequentially in ascending order of the actual numbers among the input registers. However, the present invention is not limited to this as long as a plurality of input registers is set to the transmission target block in one transmission process based on the conversion table T. For example, the CPU 101 may set the input register to the transmission target block sequentially in descending order of the actual numbers among the input registers.

Subsequently, the I/O controller 105a executes pre-processing of inhibiting an access of the CPU 101 to the transmission target block. Subsequently, the I/O controller 105a reads control data from the input buffer area (for example, four input buffer areas) corresponding to the transmission target block among the input buffer areas. Moreover, the I/O controller 105a executes a transmission process of writing the read control data to the transmission target block via the system bus 104 without the CPU 101.

When the transmission process is completed, the I/O controller 105a executes post-processing of cancelling the inhibition on the access of the CPU 101 to the transmission target block. In this way, since it is not necessary to execute pre-processing and post-processing whenever a control data transmission process is performed for one memory block and the number of executions of the control data transmission process can be reduced, it is possible to shorten the time required for the control data transmission process.

The CPU 101 sets a plurality of input registers to the transmission target block in one transmission process sequentially in ascending order of the actual numbers stored in the input register table T1 among the input registers when the post-processing is completed until the transmission process of the control data to all input registers is completed. Moreover, the I/O controller 105a repeats the pre-processing, the transmission process, and the post-processing.

Next, a transmission process of control data from the output register of the I/O data memory 103a to the output buffer area of the I/O buffer memory 105b will be described with reference to FIG. 4. The CPU 101 sets a plurality of (for example, four) output registers to a transmission target block which is a transmission source in one transmission process sequentially in ascending order of the actual numbers stored in the output register table T2 among the output registers. In the present embodiment, the CPU 101 sets the output register to the transmission target block sequentially in ascending order of the actual numbers among the output registers. However, the present invention is not limited to this as long as a plurality of output registers is set to the transmission target block in one transmission process based on the conversion table T. For example, the CPU 101 may set the output register to the transmission target block sequentially in descending order of the actual numbers among the output registers.

Subsequently, the I/O controller 105a executes pre-processing of inhibiting the access of the CPU 101 to the transmission target block. Subsequently, the I/O controller 105a reads control data from the transmission target block. Moreover, the I/O controller 105a executes a transmission process of writing the read control data to the output buffer area corresponding to the transmission target block via the system bus 104 without the CPU 101.

When the transmission process is completed, the I/O controller 105a executes post-processing of cancelling the inhibition on the access of the CPU 101 to the transmission target block. In this way, since it is not necessary to execute pre-processing and post-processing whenever a control data transmission process is performed on one memory block and the number of executions of the control data transmission process can be reduced, it is possible to shorten the time required for the control data transmission process.

The CPU 101 sets a plurality of output registers to the transmission target block in one transmission process sequentially in ascending order of the actual numbers stored in the output register table T2 among the output registers when the post-processing is completed until the transmission process of the control data from all output registers is completed. Moreover, the I/O controller 105a repeats the pre-processing, the transmission process, and the post-processing.

Figure 5:
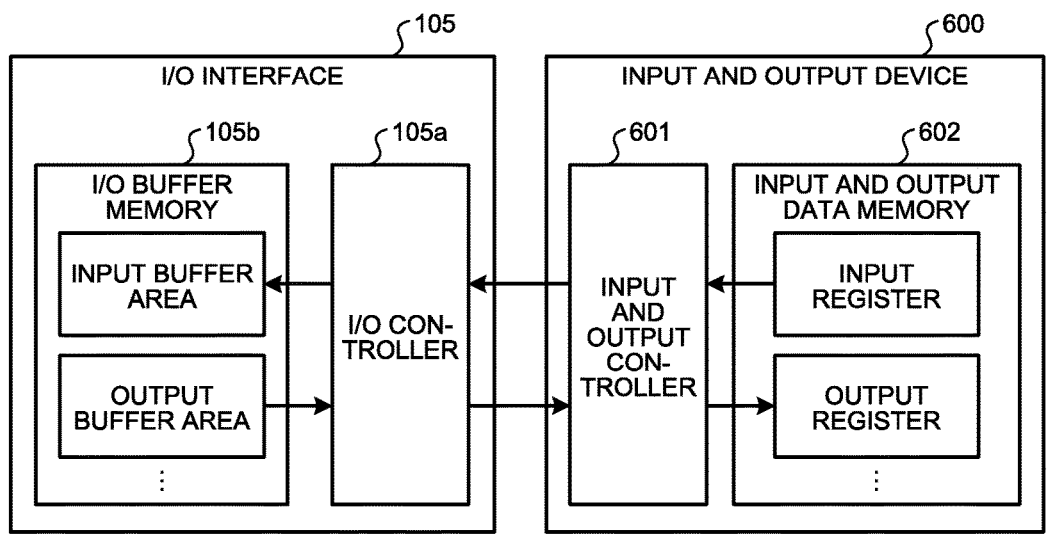
FIG. 5 is a diagram for describing an example of a communication process of the I/O controller of the control device according to the first embodiment.

Next, a communication process of the I/O controller 105a of the control device 100 will be described with reference to FIG. 5. FIG. 5 is a diagram for describing an example of a communication process of the I/O controller of the control device according to the first embodiment.

First, a process of receiving control data from the input and output device 600 will be described with reference to FIG. 5. The CPU 101 sets a plurality of (for example, four) input registers to a communication target block which is a transmission source of one communication process sequentially in ascending order of the actual numbers stored in the input register table T1 among the input registers of the input and output data memory 602. In the present embodiment, the CPU 101 sets a plurality of input registers to the communication target block which is a transmission source in one communication process sequentially in ascending order of the actual numbers stored in the input register table T1. However, the present invention is not limited to this as long as a plurality of input registers is set to the communication target block based on the conversion table T. For example, the CPU 101 may set a plurality of input registers to the communication target block in one communication process sequentially in descending order of the actual numbers stored in the input register table T1.

Subsequently, the I/O controller 105a reads control data from the communication target block of the input and output data memory 602. Moreover, the I/O controller 105a executes a communication process of writing the read control data to the input buffer area corresponding to the communication target block. In this way, since the number of executions of the communication process of the control data from the input and output data memory 602 to the I/O buffer memory 105b can be reduced, it is possible to shorten the time required for the control data communication process.

The CPU 101 sets a plurality of input registers to the communication target block in one communication process sequentially in ascending order of the actual numbers stored in the input register table T1 among the input registers until the communication process of transmitting the control data from all input registers is completed. Moreover, the I/O controller 105a repeats the control data communication process between the set communication target block and the input buffer area.

Next, a process of transmitting the control data from the control device 100 will be described with reference to FIG. 5. The CPU 101 sets a plurality of (for example, four) output registers to a communication target block which is a transmission destination in one communication process sequentially in ascending order of the actual numbers stored in the output register table T2 among the output registers of the input and output data memory 602. In the present embodiment, the CPU 101 sets a plurality of output registers to the communication target block in one communication process sequentially in ascending order of the actual numbers stored in the output register table T2. However, the present invention is not limited to this as long as a plurality of output registers is set to the communication target block based on the conversion table T. For example, the CPU 101 may set a plurality of output registers to the communication target block in one communication process sequentially in descending order of the actual numbers stored in the output register table T2.

Subsequently, the I/O controller 105a reads control data from the output buffer area corresponding to the communication target block among the output buffer areas of the I/O buffer memory 105b. Moreover, the I/O controller 105a executes a communication process of writing the read control data to the communication target block. In this way, since the number of executions of the communication process of the control data from the I/O buffer memory 105b to the input and output data memory 602 can be reduced, it is possible to shorten the time required for the control data communication process.

The CPU 101 sets a plurality of output registers to the communication target block which is a transmission destination in one communication process sequentially in ascending order of the actual numbers stored in the output register table T2 among the output registers until the communication process of transmitting control data to all output registers is completed. Moreover, the I/O controller 105a repeats the control data communication process between the set communication target block and the output buffer area.

As described above, with the control device 100 according to the first embodiment, since it is not necessary to execute pre-processing and post-processing whenever a control data transmission process is performed on one memory block and the number of executions of the control data transmission process can be reduced, it is possible to shorten the time required for the control data transmission process.

(Second Embodiment)

The present embodiment is an example in which the control device has a plurality of CPUs. In the following description, the description of the same constituent elements as those of the first embodiment will not be provided.

Figure 6:
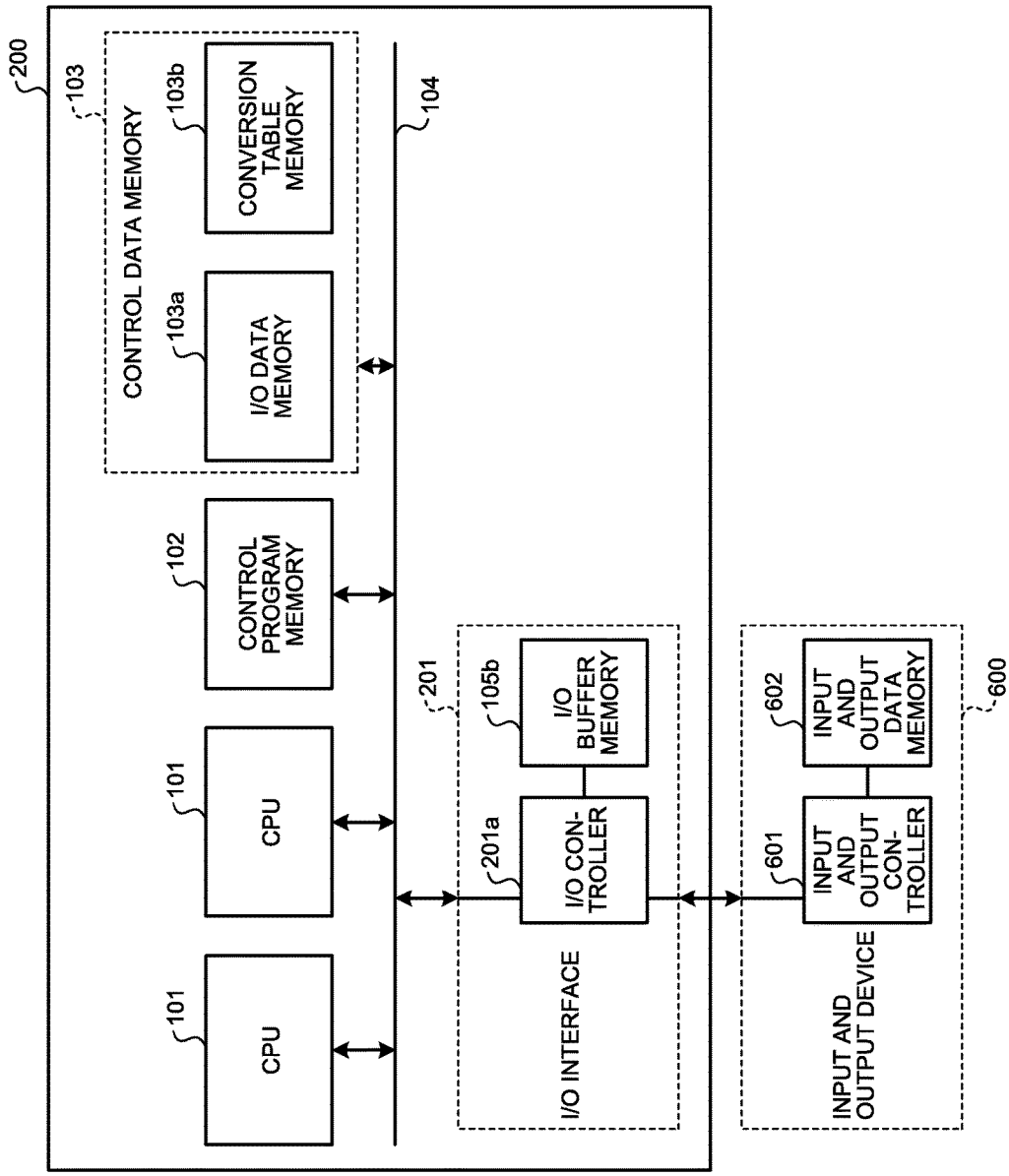
FIG. 6 is a diagram illustrating an example of a configuration of a control system according to a second embodiment.

FIG. 6 is a diagram illustrating an example of a configuration of a control system according to a second embodiment. As illustrated in FIG. 6, in the present embodiment, a control device 200 has two CPUs 101, a control program memory 102, a control data memory 103, and an I/O interface 201. Although the control device 200 has two CPUs 101 in the present embodiment, the present invention is not limited to this as long as the control device 200 has a plurality of CPUs 101 and may have three or more CPUs 101.

When a transmission process of transmitting control data between the I/O data memory 103a and the I/O buffer memory 105b is executed, the two CPUs 101 may set different memory blocks to a transmission target block in one transmission process and may set same memory blocks to the transmission target block in one transmission process.

Moreover, when a communication process of transmitting and receiving control data between the input and output data memory 602 and the I/O buffer memory 105b is executed, the two CPUs 101 may set different memory blocks to the communication target block in one communication process and may set the same memory blocks to the communication target block in one communication process.

When a transmission process of transmitting control data between the I/O data memory 103a and the I/O buffer memory 105b is executed, an I/O controller 201a sets a memory block obtained by merging the transmission target blocks set by the CPUs 101 to the transmission target block in one transmission process. For example, when one CPU 101 sets the input registers of the actual numbers 1 and 3 to the transmission target block and the other CPU 101 sets the input registers of the actual numbers 5 and 7 to the transmission target block, the I/O controller 201a sets the input registers of the actual numbers 1, 3, 5, and 7 to the transmission target block.

Moreover, when a communication process of transmitting and receiving control data between the input and output data memory 602 and the I/O buffer memory 105b is executed, the I/O controller 201a sets a memory block obtained by merging the communication target blocks set by the respective CPUs 101 to the communication target block in one communication process. For example, when one CPU 101 sets the input registers of the actual numbers 1 and 3 to the communication target block and the other CPU 101 sets the input registers of the actual numbers 5 and 7 to the communication target block, the I/O controller 201a sets the input registers of the actual numbers 1, 3, 5, and 7 to the communication target block.

With the control device 200 according to the second embodiment, it is possible to obtain the same operations and advantages as the first embodiment.

(Third Embodiment)

The present embodiment is an example in which the control device includes a plurality of I/O interfaces and a plurality of CPUs setting a transmission target block and a communication target block for different I/O interfaces. In the following description, the description of the same constituent elements as those of the second embodiment will not be provided.

Figure 7:
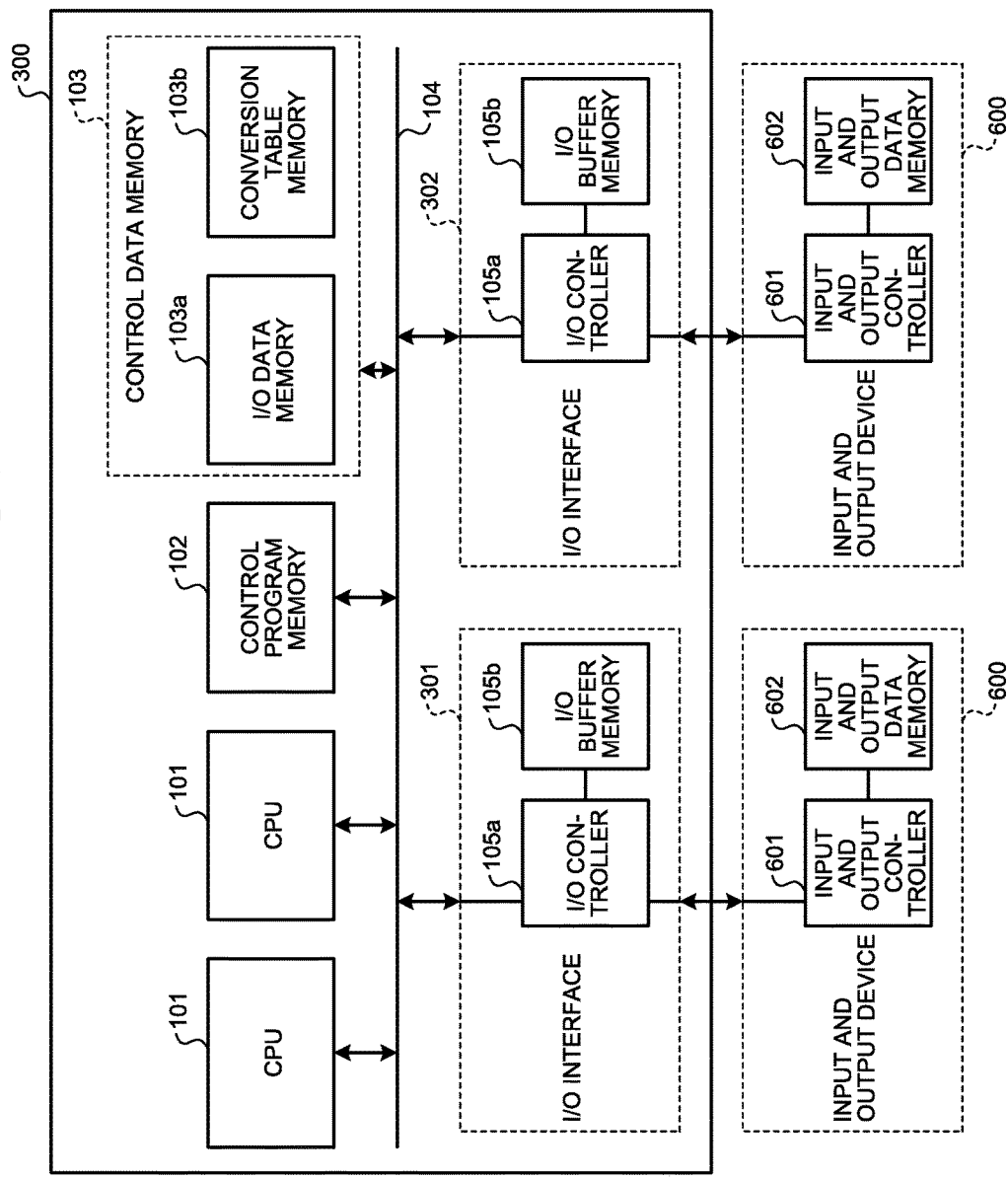
FIG. 7 is a diagram illustrating an example of a configuration of a control system according to a third embodiment.

FIG. 7 is a diagram illustrating an example of a configuration of a control system according to a third embodiment. As illustrated in FIG. 7, in the present embodiment, a control device 300 includes two CPUs 101, a control program memory 102, a control data memory 103, and I/O interfaces 301 and 302.

The I/O controllers 105a of the respective I/O interfaces 301 and 302 execute a communication process with different input and output devices 600. Although the control device 300 has two I/O interfaces 301 and 302 in the present embodiment, the present invention is not limited to this and the control device 300 may have three or more I/O interfaces 301 and 302.

In the present embodiment, one CPU 101 (an example of a first controller) of the two CPUs 101 sets a memory block provided in the input and output device 600 on which the I/O interface 301 (an example of a first communication unit) executes a communication process among the memory blocks of the I/O data memory 103a and the input and output data memory 602 to the transmission target block and the communication target block.

On the other hand, the other CPU 101 (an example of a second controller) sets a memory block provided in the input and output device 600 on which the I/O interface 302 (an example of a second communication unit) executes a communication process among the memory blocks of the I/O data memory 103a and the input and output data memory 602 to the transmission target block and the communication target block. That is, the two CPUs 101 set the transmission target block and the communication target block for different I/O interfaces 301 and 302.

As described above, with the control device 300 according to the third embodiment, since one I/O interface 301 does not need to execute the communication process for all input and output devices 600 and the transmission process for all memory blocks of the I/O data memory 103a, it is possible to reduce a processing load of the I/O interfaces 301 and 302.

(Fourth Embodiment)

The present embodiment is an example in which one I/O interface among a plurality of I/O interfaces can execute a communication process with an input and output device instead of other I/O interfaces. In the following description, the description of the same constituent elements as those of the third embodiment will not be provided.

Figure 8:
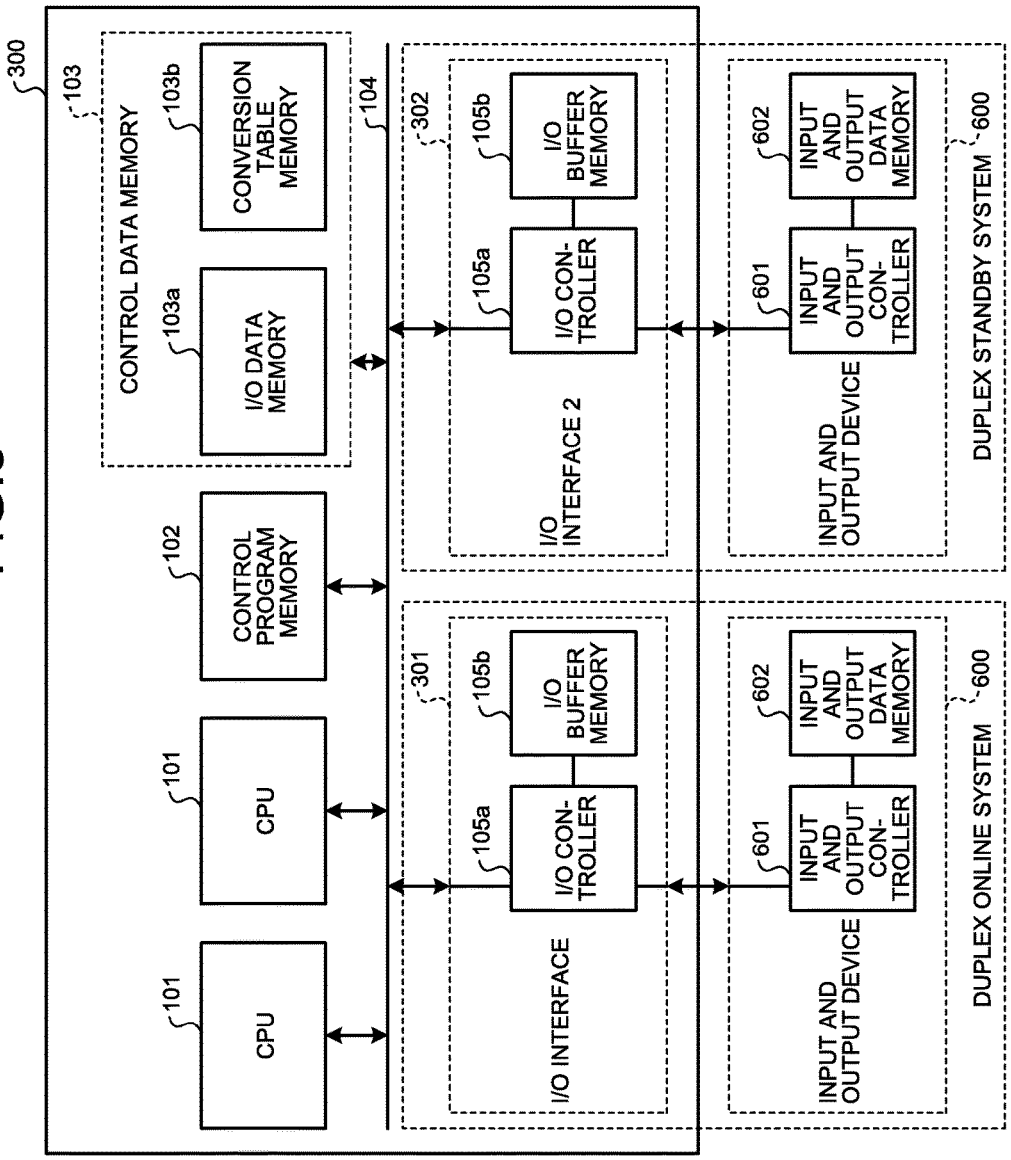
FIG. 8 is a diagram illustrating an example of a configuration of a control system according to a fourth embodiment.

FIG. 8 is a diagram illustrating an example of a configuration of a control system according to a fourth embodiment. As illustrated in FIG. 8, in the present embodiment, the I/O interface 301 of the control device 300 functions as an online system that always performs a communication process with the input and output device 600. On the other hand, the I/O interface 302 of the control device 300 functions as a standby system that performs a communication process with the input and output device 600 instead of the I/O interface 301 when an error occurs in the communication process of the I/O interface 301, for example.

As described above, with the control device 300 according to the fourth embodiment, even when the I/O interface 301 of the online system cannot perform a communication process with the input and output device 600, the I/O interface 302 of the standby system can continue the communication process with the input and output device 600.

(Fifth Embodiment)

The present embodiment is an example in which a conversion table stores an actual number with which a memory block can be identified, and a virtual number with which a buffer block corresponding to the memory block can be identified in correlation. In the following description, the description of the same constituent elements as those of the first embodiment will not be provided.

Figure 9:
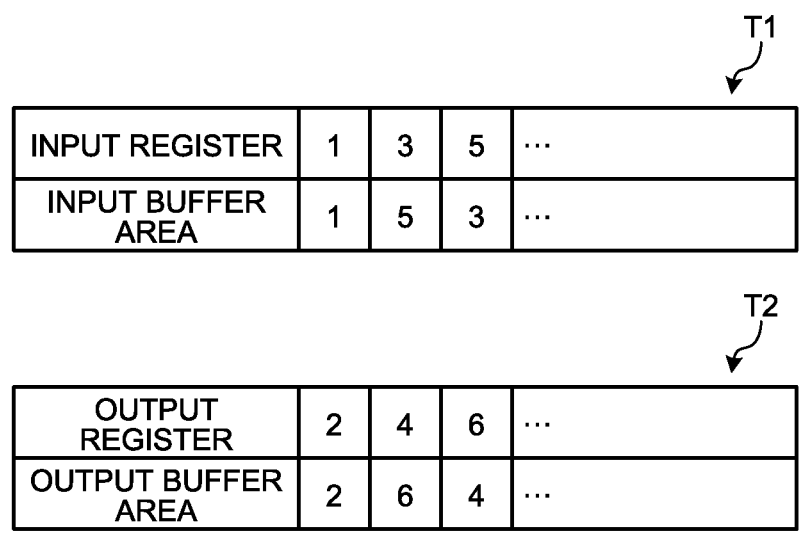
FIG. 9 is a diagram illustrating an example of a conversion table stored in a control device according to a fifth embodiment.

FIG. 9 is a diagram illustrating an example of a conversion table stored in a control device according to a fifth embodiment. As illustrated in FIG. 9, in the present embodiment, an input register table T1 correlates the actual number of the input register and a virtual number with which the input buffer area corresponding to the input register can be identified with each other. An output register table T2 correlates the actual number of the output register and a virtual number with which the output buffer area corresponding to the output register can be identified with each other.

Figure 10:
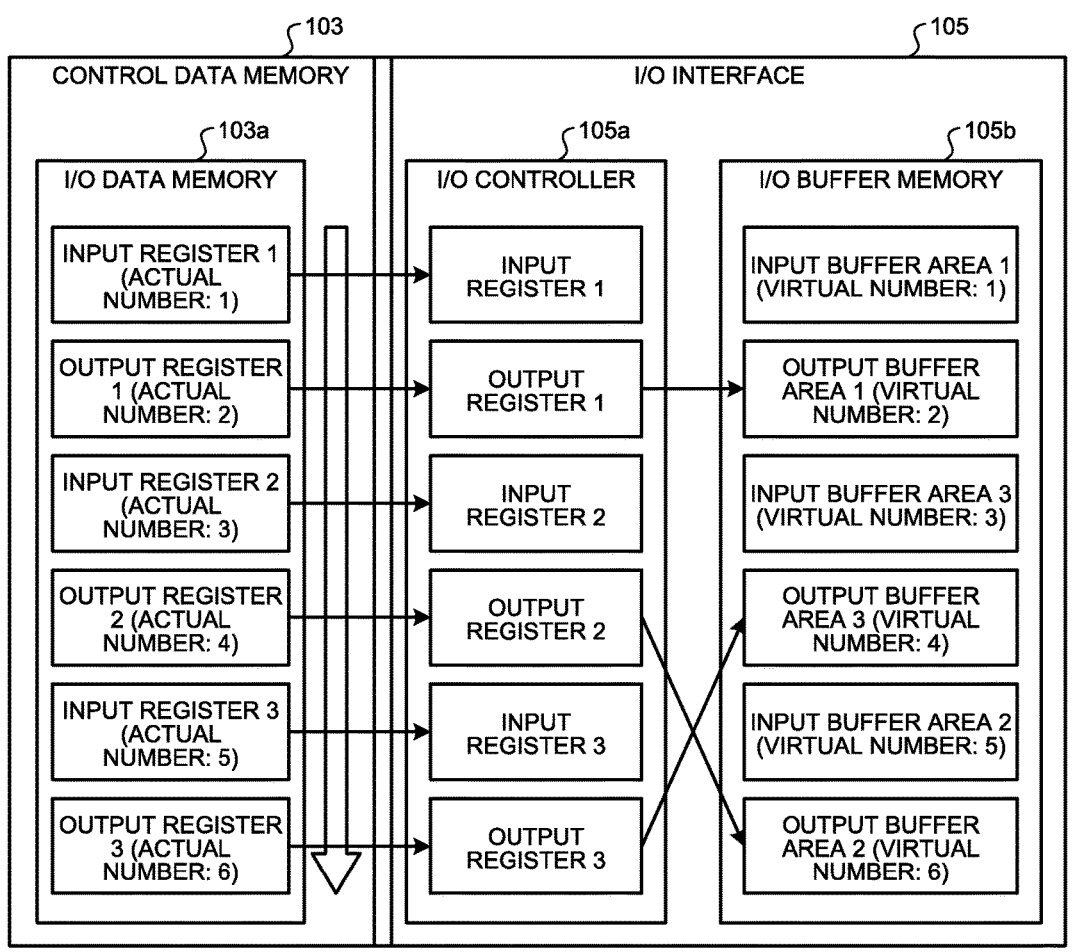
FIG. 10 is a diagram for describing an example of a transmission process of the control device according to the fifth embodiment.
Figure 11:
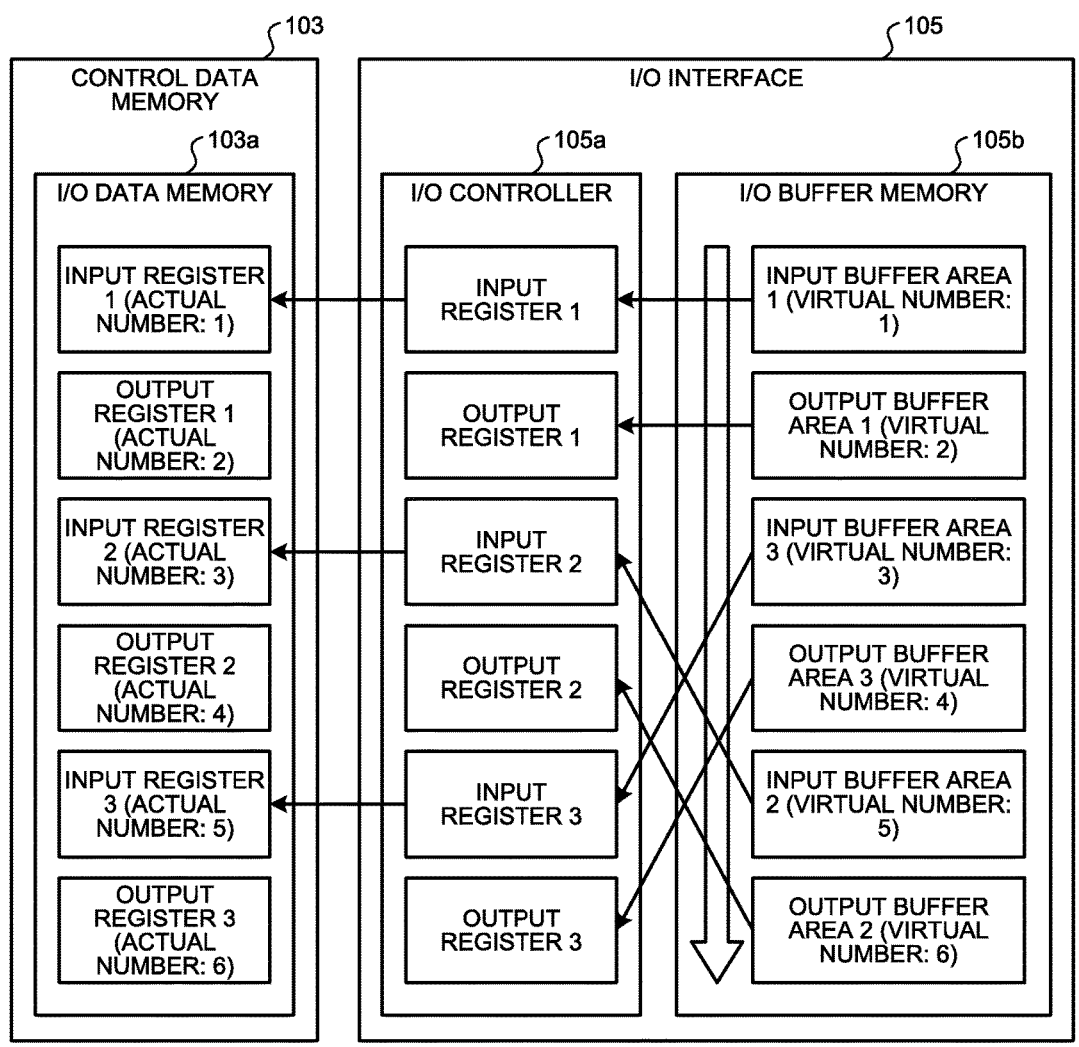
FIG. 11 is a diagram for describing an example of a transmission process of the control device according to the fifth embodiment.

FIGS. 10 and 11 are diagrams for describing an example of a transmission process of a control device according to the fifth embodiment. First, a transmission process of control data from the I/O data memory 103a to the I/O buffer memory 105b will be described with reference to FIG. 10. The I/O controller 105a specifies virtual numbers stored in correlation with the actual numbers of the output registers 1 to 3 based on the output register table T2 when control data is transmitted from the output registers 1 to 3 which are transmission target blocks of the I/O data memory 103a to the I/O buffer memory 105b by the transmission process.

Moreover, the I/O controller 105a sets the output buffer areas 1 to 3 of the specified virtual numbers to the transmission destination of the control data stored in the output registers 1 to 3. In this way, even when the address of the output register which is the transmission target block is different from the address of the output buffer area corresponding to the output register, it is possible to transmit control data to the output buffer area corresponding to the output register.

For example, as illustrated in FIG. 10, the I/O controller 105a specifies the virtual number 6 correlated with the actual number 4 of the output register 2 in the output register table T2. Moreover, the I/O controller 105a transmits the control data stored in the output register 2 to the output buffer area 2 of the specified virtual number 6.

Moreover, the I/O controller 105a may set only a predetermined output register (for example, the output register in which the control data is updated by the CPU 101) among the output registers of the I/O data memory 103a to the transmission target block. In this way, since the number of output registers to which control data is transmitted by the transmission process can be reduced, it is possible to further shorten the time required for the control data transmission process.

Next, a transmission process of control data from the I/O buffer memory 105b to the I/O data memory 103a will be described with reference to FIG. 11. The I/O controller 105a specifies virtual numbers stored in correlation with the actual numbers of the input registers 1 to 3 based on the input register table T1 when control data is transmitted from the I/O buffer memory 105b to the input registers 1 to 3 which are the transmission target blocks of the I/O data memory 103a by the transmission process.

Moreover, the I/O controller 105a sets input buffer areas 1 to 3 of the specified virtual numbers to a transmission source from which control data stored in the input registers 1 to 3 is transmitted. In this way, it is possible to transmit control data from the input buffer area corresponding to the transmission target block to the transmission target block even when the address of the input register which is the transmission target block is different from the address of the input buffer area corresponding to the input register.

For example, as illustrated in FIG. 11, the I/O controller 105a specifies a virtual number 5 correlated with the actual number 3 of the input register 2 in the input register table T1. Moreover, the I/O controller 105a transmits the control data stored in the input buffer area 2 of the specified virtual number 5 to the input register 2.

Moreover, the I/O controller 105a may set only a predetermined input register (for example, the input register corresponding to the input buffer area in which the control data is updated by the communication process with the input and output device 600) among the input registers of the I/O data memory 103a to the transmission target block. In this way, since the number of input registers to which control data is transmitted by the transmission process can be reduced, it is possible to further shorten the time required for the control data transmission process.

As described above, with the control device 100 according to the fifth embodiment, it is possible to transmit control data between a transmission target block and a buffer block which correspond to each other even when the address of the transmission target block is different from the address of the buffer block corresponding to the transmission target block.

(Sixth Embodiment)

The present embodiment is an example in which control data is transmitted and received between an I/O buffer memory and an input and output data memory using a conversion table. In the following description, the description of the same constituent elements as those of the fifth embodiment will not be provided.

Figure 12:
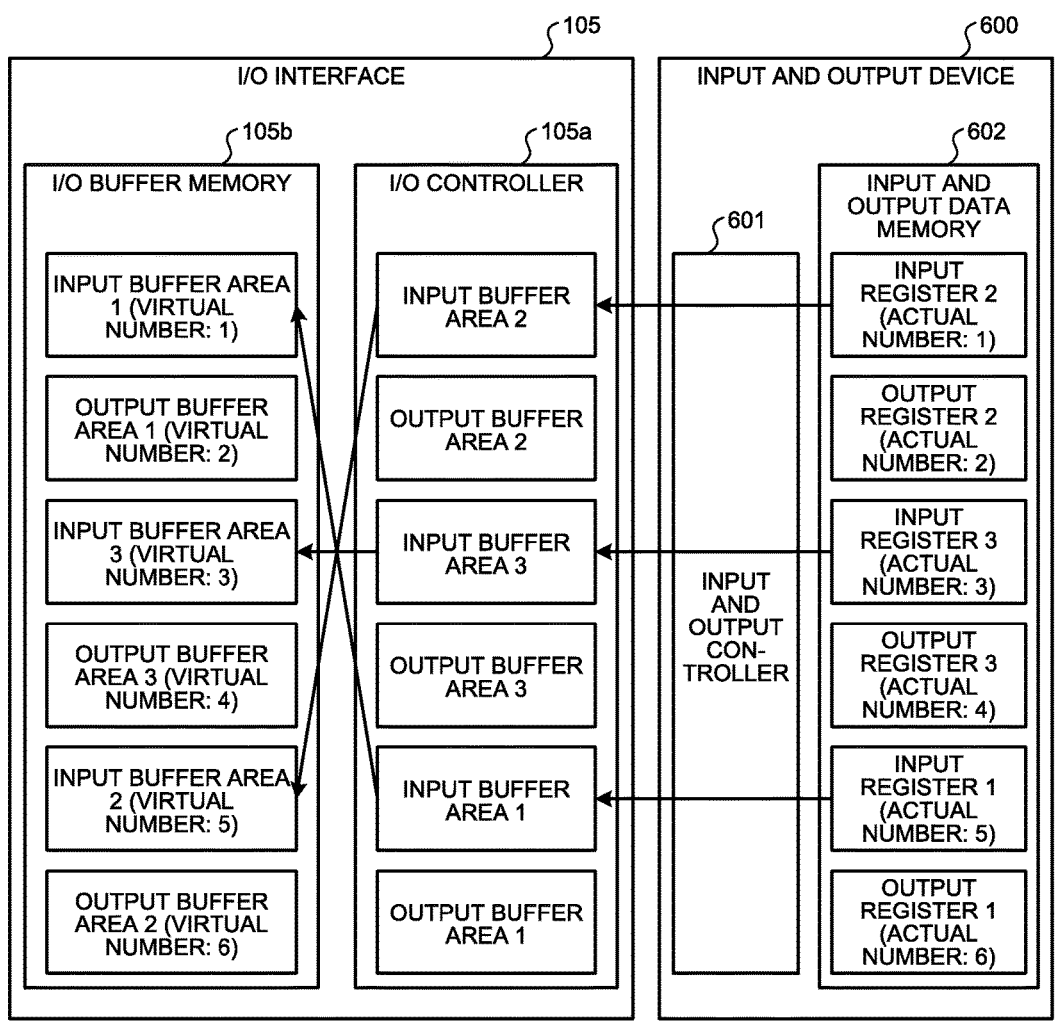
FIG. 12 is a diagram for describing an example of a communication process of a control device according to a sixth embodiment.
Figure 13:
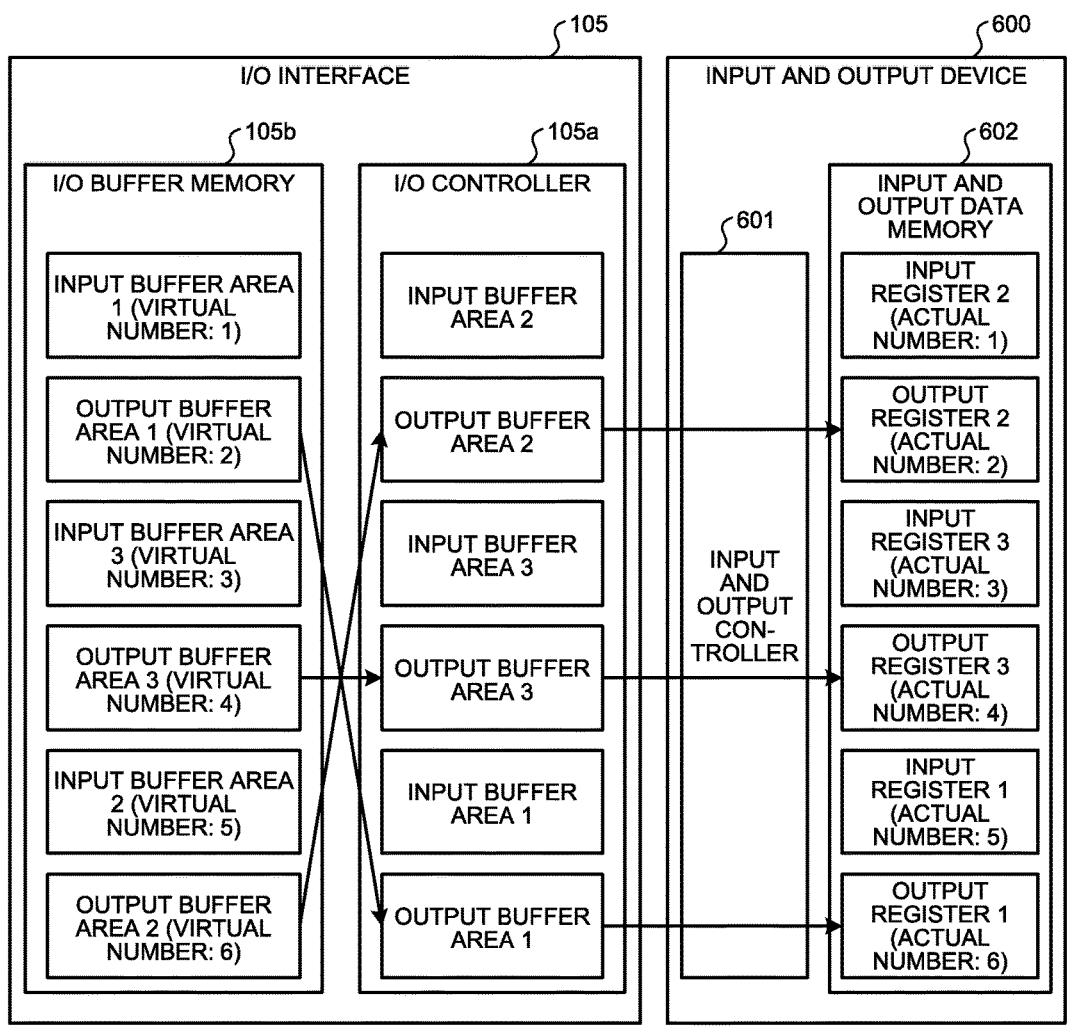
FIG. 13 is a diagram for describing an example of a communication process of the control device according to the sixth embodiment.

FIGS. 12 and 13 are diagrams for describing an example of a communication process in a control device according to a sixth embodiment. First, a communication process of control data from the input and output data memory 602 to the I/O buffer memory 105b will be described with reference to FIG. 12. The I/O controller 105a specifies virtual numbers stored in correlation with the actual numbers of the input registers 1 to 3 based on the input register table T1 when control data is transmitted from the input registers 1 to 3 which are communication target blocks of the input and output data memory 602 to the I/O buffer memory 105b by the communication process.

Moreover, the I/O controller 105a sets the input buffer areas 1 to 3 of the specified virtual numbers to the transmission destination of the control data stored in the input registers 1 to 3. In this way, it is possible to transmit control data to the input buffer area corresponding to the communication target block even when the address of the input register which is the communication target block is different from the address of the input buffer area corresponding to the input register.

For example, as illustrated in FIG. 12, the I/O controller 105a specifies the virtual number 5 stored in correlation with the actual number 1 of the input register 2 based on the input register table T1 when control data is transmitted from the input register 2 of the input and output data memory 602 to the I/O buffer memory 105b. Moreover, the I/O controller 105a stores the control data stored in the input register 2 in the input buffer area 2 of the specified virtual number 5.

Moreover, the I/O controller 105a may set only a predetermined input register (for example, the input register in which the control data is updated) among the input registers of the input and output data memory 602 to the communication target block. In this way, since the number of input registers to which control data is transmitted by the communication process can be reduced, it is possible to further shorten the time required for the control data communication process.

Next, a communication process of control data from the I/O buffer memory 105b to the input and output data memory 602 will be described with reference to FIG. 13. The I/O controller 105a specifies the virtual numbers stored in correlation with the actual numbers of the output registers 1 to 3 based on the output register table T2 when control data is transmitted from the I/O buffer memory 105b to the output registers 1 to 3 which are the communication target blocks of the input and output data memory 602 by the communication process.

Moreover, the I/O controller 105a sets the output buffer areas 1 to 3 of the specified virtual numbers to a transmission source from which control data is transmitted to the output registers 1 to 3. In this way, it is possible to transmit control data from the output buffer area corresponding to the communication target block to the communication target block even when the address of the output register which is the communication target block is different from the address of the output buffer area corresponding to the output register.

For example, as illustrated in FIG. 13, the I/O controller 105a specifies the virtual number 6 stored in correlation with the actual number 2 of the output register 2 based on the output register table T2 when control data is transmitted from the I/O buffer memory 105b to the output register 2 of the input and output data memory 602. Moreover, the I/O controller 105a transmits the control data stored in the output buffer area 2 of the specified virtual number 6 to the output register 2.

Moreover, the I/O controller 105a may set only a predetermined output register (for example, the output register corresponding to the output buffer area in which the control data is updated by the CPU 101) among the output registers of the input and output data memory 602 to the communication target block. In this way, since the number of output registers to which control data is transmitted by the communication process can be reduced, it is possible to further shorten the time required for the control data communication process.

It is assumed that, when the actual numbers of the input register and the output register of the input and output data memory 602 are different from the actual numbers of the input register and the output register of the input and output data memory 602, the conversion table memory 103*b* stores a table that correlates the actual number of the input register of the input and output data memory 602 with the virtual number of the input buffer area corresponding to the input register and a table that correlates the actual number of the output register of the input and output data memory 602 with the virtual number of the output buffer area corresponding to the output register in addition to the conversion table T. Moreover, it is assumed that the I/O controller 105*a* sets the buffer memory which is the transmission destination or the transmission source of the control data using the tables.

As described above, with the control device 100 according to the sixth embodiment, it is possible to transmit and receive control data between a communication target block and a buffer block which correspond to each other even when the address of the communication target block is different from the address of the buffer block corresponding to the communication target block.

As described above, according to the first to sixth embodiments, it is possible to shorten the time required for the control data transmission process.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A control device, comprising:
   a first memory that has a plurality of memory areas and stores first data related to control of an external device including a third memory that has the same memory areas as the first memory;
   a controller that executes an access to the memory areas of the first memory;
   a communication unit that includes a buffer memory having a buffer area corresponding to each memory area of the first memory, and a communication controller that performs a communication process of transmitting the first data to the external device and receiving the first data from the external device, a storage process of storing the first data in the buffer area, a transmission process of transmitting the first data between a first predetermined area of the memory area of the first memory and a buffer area corresponding to the first predetermined area without the controller, and an inhibition process of inhibiting an access of the controller to the first predetermined area whenever the transmission process is performed; and
   a second memory that stores a table with which an input area and an output area can be identified within the memory areas of the first memory, the input area being the memory area storing the first data received from the external device within the memory areas of the first memory, and the output area being the memory area storing the first data to be transmitted to the external device within the memory areas of the first memory, wherein
   the communication controller executes the communication process of transmitting and receiving the first data between a second predetermined area within the memory areas of the third memory and the buffer area corresponding to the second predetermined area, and
   the controller
      sets the input areas of the first memory to the first predetermined area in one transmission process based on the table when the first data is transmitted from the buffer area to the memory area of the first memory and sets the output areas of the first memory to the first predetermined area in one transmission process based on the table when the first data is transmitted from the memory area of the first memory to the buffer area, and
      sets the output areas of the third memory to the second predetermined area in one communication process by referring to the table when the first data is transmitted to the external device, and sets the input areas of the third memory to the second predetermined area in one communication process by referring to the table when the first data is received from the external device.

2. The control device according to claim 1, comprising:
   a plurality of the controllers, wherein
   the communication controller merges the first predetermined areas set by the respective controllers and merges the second predetermined areas set by the respective controller.

3. The control device according to claim 2, wherein
   the memory area is provided in each external device,
   the control device includes a plurality of the communication units that executes the communication process with different external devices,
   a first controller of the controllers sets the memory area provided for the external device on which a first communication unit of the communication units executes the communication process among the memory areas of the first and third memories to the first predetermined area and the second predetermined area, and
   the second controller of the controllers sets the memory area provided for the external device on which a second communication unit different from the first communication unit among the communication units executes the communication process among the memory areas of the first and third memories to the first predetermined area and the second predetermined area.

4. The control device according to claim 3, wherein
   the second communication unit executes the communication process with the external device instead of the first communication unit.

5. The control device according to claim 1, wherein
   the table further stores an actual number with which the memory area can be identified and a virtual number with which the buffer area corresponding to the memory area can be identified in correlation with each other,
   the communication controller sets the buffer area of the virtual number stored in correlation with the actual number of the second predetermined area to a transmission source based on the table when the first data is transmitted from the buffer area to the second predetermined area by the communication process, and sets the buffer area of the virtual number correlated with the actual number of the second predetermined area to a transmission destination based on the table when the first data is transmitted from the second predetermined area to the buffer area by the communication process, and the controller sets only a predetermined input area or a predetermined output area of the third memory to the second predetermined area.

6. The control device according to claim 1, wherein
the table further stores an actual number with which the memory area of the first memory can be identified and a virtual number with which the buffer area corresponding to the memory area of the first memory can be identified in correlation with each other, and the communication controller sets the buffer area of the virtual number stored in correlation with the actual number of the first predetermined area to a transmission source based on the table when the first data is transmitted from the buffer area to the first predetermined area by the transmission process, and sets the buffer area of the virtual number correlated with the actual number of the first predetermined area to a transmission destination based on the table when the first data is transmitted from the first predetermined area to the buffer memory by the communication process.

7. The control device according to claim 1, wherein
the controller sets only a predetermined input area or a predetermined output area of the first memory to the first predetermined area.

8. A control method, executed by a control device including:
a first memory that has a plurality of memory areas and stores first data related to control of an external device including a third memory that has the same memory areas as the first memory; a controller that executes an access to the memory areas of the first memory; a communication unit that includes a buffer memory having a buffer area corresponding to each memory area of the first memory, and a communication controller that performs a communication process of transmitting the first data to the external device and receiving the first data from the external device, a storage process of storing the first data in the buffer area, a transmission process of transmitting the first data between a first predetermined area of the memory area of the first memory and a buffer area corresponding to the first predetermined area without the controller, and an inhibition process of inhibiting an access of the controller to the first predetermined area whenever the transmission process is performed; and a second memory that stores a table with which an input area and an output area can be identified within the memory areas of the first memory, the input area being the memory area storing the first data received from the external device within the memory areas of the first memory, and the output area being the memory area storing the first data to be transmitted to the external device within the memory areas of the first memory, the control method comprising:

executing the communication process of transmitting and receiving the first data between a second predetermined area within the memory areas of the third memory and the buffer area corresponding to the second predetermined area;

setting the input areas of the first memory to the first predetermined area in one transmission process based on the table when the first data is transmitted from the buffer area to the memory area of the first memory;

setting the output areas of the first memory to the first predetermined area in one transmission process based on the table when the first data is transmitted from the memory area of the first memory to the buffer area;

setting the output areas of the third memory to the second predetermined area in one communication process by referring to the table when the first data is transmitted to the external device; and setting the input areas of the third memory to the second predetermined area in one communication process by referring to the table when the first data is received from the external device.

* * * * *